United States Patent [19]
Leber et al.

[11] Patent Number: 5,785,143
[45] Date of Patent: Jul. 28, 1998

[54] MOTOR-VEHICLE DRIVE LINE WITH A DRIVE MOTOR, GEARBOX AND AXLE

[75] Inventors: Fritz Leber; Wolfgang Rebholz; Tilo Huber, all of Friedrichshafen, Germany

[73] Assignee: ZF Friedrichshafen AG, Friedrichshafen, Germany

[21] Appl. No.: 633,785

[22] PCT Filed: Oct. 15, 1994

[86] PCT No.: PCT/EP94/03403

§ 371 Date: Apr. 18, 1996

§ 102(e) Date: Apr. 18, 1996

[87] PCT Pub. No.: WO95/11141

PCT Pub. Date: Apr. 27, 1995

[30] Foreign Application Priority Data

Oct. 20, 1993 [DE] Germany ............... 43 35 756.3

[51] Int. Cl.⁶ ................................................. B60K 17/22
[52] U.S. Cl. ........................ 180/374; 180/376; 180/382
[58] Field of Search .............................. 180/374–377, 180/358, 382, 363

[56] References Cited

U.S. PATENT DOCUMENTS

| | | | |
|---|---|---|---|
| 3,361,222 | 1/1968 | Lamburn | 180/382 |
| 3,428,140 | 2/1969 | Tolan, Jr. | 180/358 |
| 4,387,605 | 6/1983 | Grey et al. | 180/374 |

FOREIGN PATENT DOCUMENTS

| | | |
|---|---|---|
| 976 276 | 6/1963 | Germany. |
| 578565 | 7/1946 | United Kingdom. |
| 2 035 235 | 6/1980 | United Kingdom. |

*Primary Examiner*—Dean Kramer
*Attorney, Agent, or Firm*—Davis and Bujold

[57] ABSTRACT

The invention concerns a motor-vehicle drive train (1) with a drive motor (2), a transmission (3) and an axle (6). An output shaft (7) of the transmission (3) is attached to a joint shaft (9) by a joint (8). Another joint (10) transmits the drive from the joint shaft (9) to an input shaft (11) of a differential transmission (4). In order to allow the joint shaft (9) to have a W-configuration, the drive motor (2) and the transmission (3) are mounted so that they can pivot about the axle (6). All divergences existing in a longitudinal direction of the drive train (1) immediately produce large angles of inflection in the joints. Irregularities in the drive train are hereby avoided. In addition to reducing the load on the joints, the generation of disagreeable noises is avoided. The invention is particularly used in utility vehicles such as employed in the construction industry and in agriculture.

17 Claims, 3 Drawing Sheets

MOTOR-VEHICLE DRIVE LINE WITH A DRIVE MOTOR, GEARBOX AND AXLE

The invention concerns a motor-vehicle drive train with a drive motor, a transmission and an axle. In the known construction of motor vehicles, especially industrial lift trucks such as fork lift trucks, the transmission and the axle are separately suspended or fastened to the chassis. An exception to this is the transaxle construction in which the transmission and the axle are built as a one piece.

As a rule, the torque is transmitted from the transmission to the axle via a joint shaft. When, for practical reasons, said joint shaft is of a short length, divergences in the fastening points of the suspension act very strongly upon the joint shaft. Divergences of different magnitudes are not unusual since the fastening points—like the rest of the chassis—are designed as welded structures.

In a so-called Z-configuration of the joint shaft, large angles of inflection, which very severely load the joints, are generated as result of an axle offset of a few millimeters. Additional divergences appear, for example, when deviating from the correct position of installation of the axle. If, for example, the axle is installed in an off-set position (tilted) by a small angle in respect to horizontal and relative to the transmission, an additional angular error appears which results in irregularities in the drive train. Said irregularities cause unpleasant noises.

The problem to be solved by the invention is to configurate a drive train of the above described kind in a manner such that divergences from the theoretically correct installation position remain practically without reactions upon the input shafts. Irregularities and noises resulting therefrom are to be especially avoided.

The problem on which the invention is based is solved by pivotably mounting on the axle, in a vertical plane, elements of the drive train. Said elements consist at least of a drive motor and a transmission. Due to the relative rotary motion of elements of the drive train (drive motor, transmission), vis-a-vis other elements of the drive train (axle), there results a W-configuration of the joint shaft or other equivalent articulation (universal joint). All the divergences (erroneous positions) generate inflection angles of equal magnitude on the joints. Irregularities in the drive train are prevented hereby. In addition to a reduction of load on the joints, the generation of unpleasant noises is prevented.

The axis of rotation—as seen in a side view of the drive train—is at the center of the joint shaft. Therefore, the joints that connect the input and output shafts with the joint shaft are at equal distances from the axis of rotation.

In a preferred embodiment, the joint shaft connects an output shaft of the transmission with an input shaft of a differential transmission. The connection is made by joints. A universal joint can also be used instead of a short joint shaft.

In a preferred practical solution, the axis of rotation extends through the centers of two bolts which are part of the two joints. It is advantageous that the bolts pass through rubber elements in order to damp resulting noises. Said rubber elements can be situated in bearing brackets or in guide rods. A structurally simple configuration results when fastening the bearing brackets on the transmission and the guide rods on the axle. The bearing brackets or the guide rods can be designed as separate parts. They are preferably made as one piece with the transmission of the axle.

In a practically simple solution, the guide rods have fork-like ends which are penetrated by the bolts. The bearing brackets mesh in the U-shaped free spaces of the fork-like ends of the guide rods. The bearing brackets accommodate the rubber elements in which the bolts are supported.

To compensate for lateral erroneous positions during assembly, for example, when the axle does not extend exactly in a transverse direction of the vehicle, the elements of the drive train pivotably situated relative to the axle are supported in an additional joint.

Axial displacements resulting on the joint shaft from different angles of inflection are compensated by changing the actual length of the output shaft of the transmission or of the input shaft of the differential transmission. Several practical possibilities exist for this purpose. The flange of the output shaft of the transmission can, for example, be non-rotatably but axially movably situated upon the output shaft by engaging gears.

Other features, essential to the invention and the advantages resulting therefrom, are to be understood from the following description of an embodiment. In the drawings.

Figure 1:
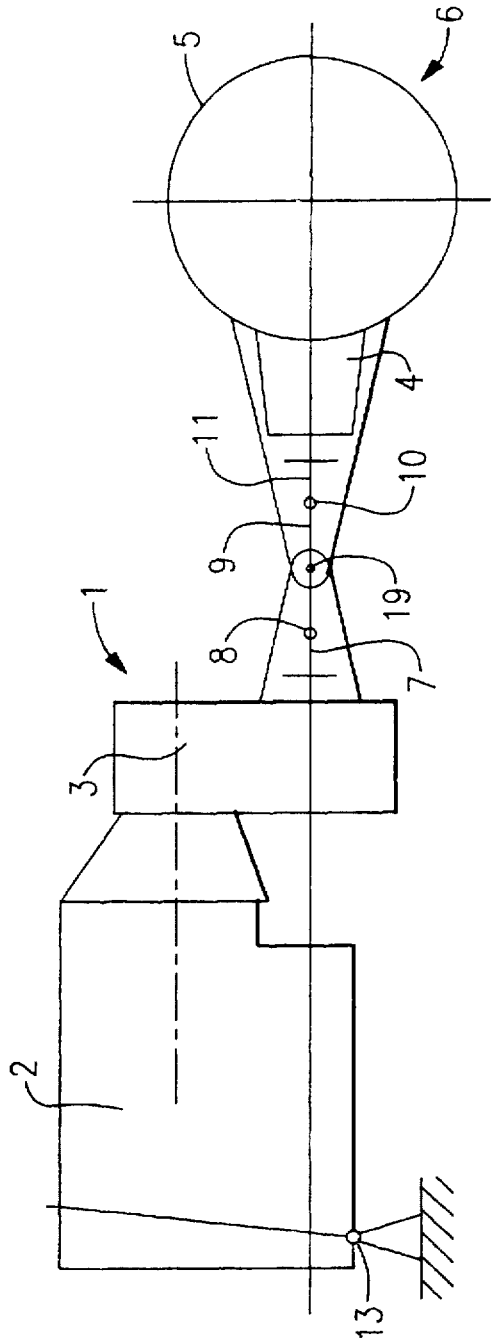
FIG. 1 is an extensively simplified diagrammatic side view of a drive train under ideal installation conditions.

The drive train 1, reproduced in FIG. 1 as an extensively simplified, diagrammatic side view, is composed of elements which meet the following requirements: makes possible the start, the change of torque and speed, makes possible different directions of rotation for forward and reverse motion, transmits traction and thrust, allows different speeds of the input gears when cornering and permits operation of the drive motor 2 in a consumption and an exhaust optimum of the performance graph.

Parking, starting and power interruption are made possible by actuating a clutch, itself not shown. The engine torque and the speeds are changed in a transmission 3 according to the traction need of a vehicle, itself not shown. A differential transmission 4, situated in a symmetrical housing 5 of a diagrammatically configurated axle 6, takes care of the compensation of the different axle and wheel speeds when cornering and of the uniform distribution of the drive torque.

An output shaft 7 of the transmission 3 is non-rotatably and flexibly connected via a joint 8 with a (short) joint shaft 9. The joint shaft 9 is likewise non-rotatably and flexibly connected via a joint 10 with an input shaft 11 of the differential transmission 4.

It can be seen from the diagrammatic drawing of FIG. 1 that, assuming ideal conditions, the output shaft 7 of the joint shaft 9 and the input shaft 11 of the differential transmission 4 occupy an extended position. Assuming said ideal conditions of installation, this situation also applies to the arrangement seen in the top view.

During the torque transmission in the drive train 1 between the transmission 3 and the axle 6, errors in the suspension of the elements of the drive train (especially the drive motor, the transmission and the axle) can very severely affect the joint shaft 9. In a conventional Z-configuration of the joint shaft, large angles of inflection, which very heavily load the joints 8 and 10, immediately generate due to really slight axle divergences of a few millimeters. Complicating the situation it also occurs that in a tilted installation of the axle 6, relative to the transmission 3, an angular error which leads to irregularities of the drive train additionally appears. Said irregularities cause undesired noises.

From the illustration in FIG. 1, it can be seen that the transmission 3 is connected with the axle 6 by at least one joint 12. In a preferred embodiment (see FIG. 4 in particular) two such joints 12 are used which define an axis of rotation extending in a transverse direction of the vehicle. The elements of the drive train, such as the drive motor and the directly flanged transmission, can rotate about said axis of rotation as a structural unit.

The suspension of the drive train is completed by a third joint 13. The third joint 13 can be provided on the transmission 3 or on the driving motor 2. The third joint 13 compensates for erroneous divergences in a lateral direction (for example, errors resulting when the axle has not been installed exactly across the direction of travel).

In the drive train of FIG. 1, the elements drive motor 2 and the transmission 3 are supported by the joint 13 and directly by the axle 6. The joints 12—see the side view—are in the center between the joints 8 and 10 so that the spaces between the joints 8 and 12 and 10 and 12 have the same size (see FIG. 4).

Figure 2:
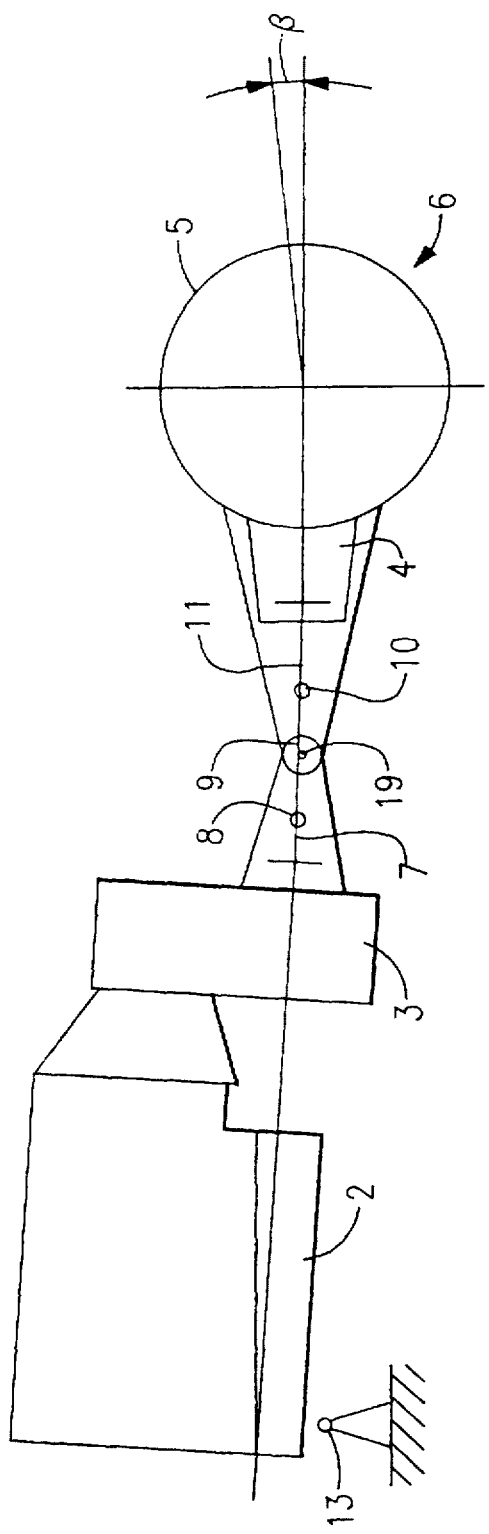
FIG. 2 is a diagrammatic, extensively simplified illustration of a drive train where an axle has been installed in a rotated position.

If, as illustrated in the diagrammatic drawing of FIG. 2—diverging from the ideal state of FIG. 1—the installation has now been rotated by an angle beta (erroneous angle due to manufacturing tolerances) there results a so-called W-configuration of the joint shaft 9. In the W-configuration, the output shaft 7 (input shaft) and the input shaft 11 (output shaft) intersect in one plane. Said configuration has the advantage that all angular divergences, in the longitudinal direction of the drive train, appear as angles of inflection of equal magnitude (vertical angular divergences of the output shaft 7 and of the input shaft 11 relative to the joint shaft 9) on the joints 8 and 10. The joint (9) and the joints (8 and 10) form a connection. The errors in lateral direction are compensated by the joint 13. The W-configuration has the advantage that unavoidable manufacturing tolerances, that is, errors in the fastening point of the suspension of the drive motor, of the transmission and of the axle, produce no irregularities in the drive train. The angles of inflection in the joints change only slightly so that the joints are not excessively loaded. Noises are avoided since no irregularities occur in the drive train. A universal joint 20 (diagrammatically shown in FIG. 4) can also be used instead of a joint shaft 9.

Figure 3:
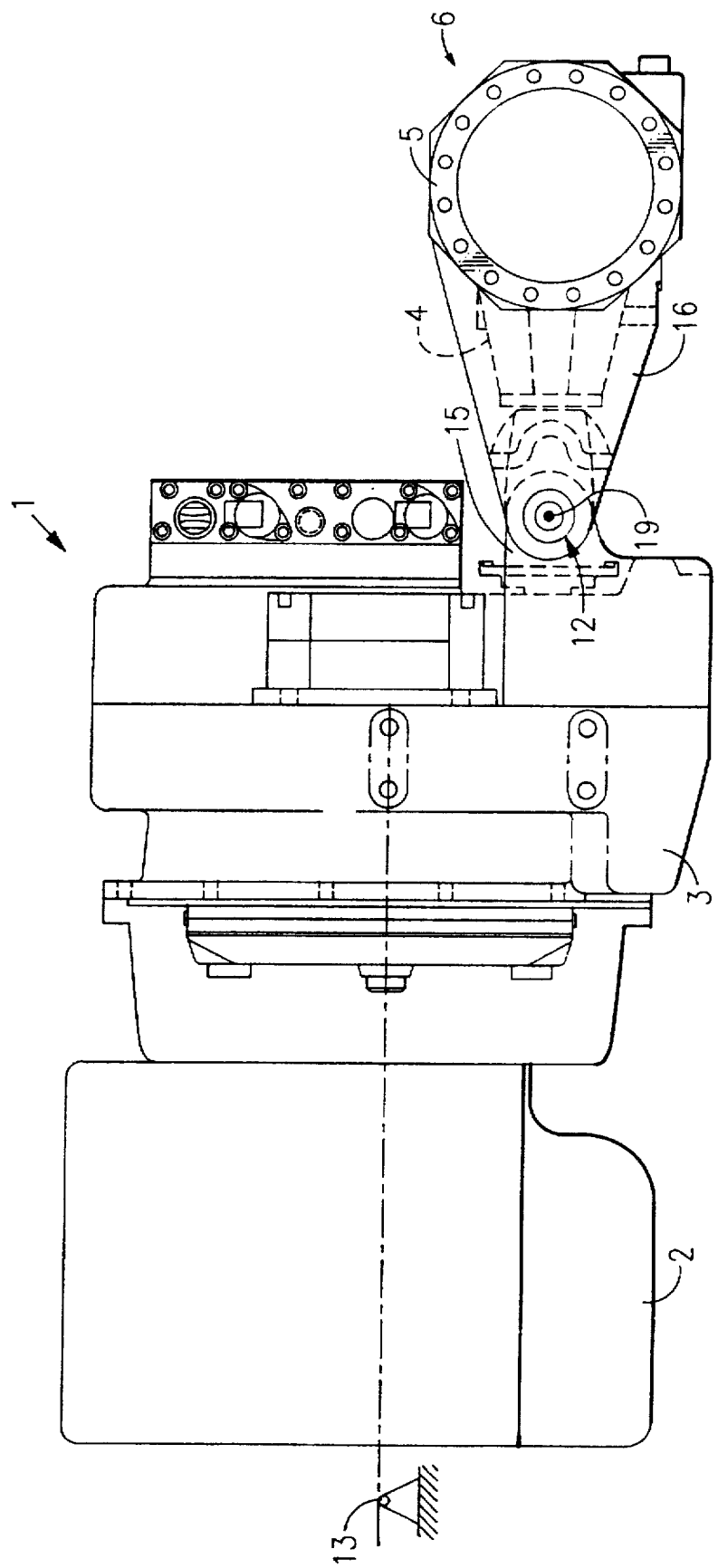
FIG. 3 is the simplified side view of a structurally designed embodiment of the drive train.

In FIG. 3 a constructionally finished embodiment is sketched in its outlines—as seen in the side view. The drive motor 2 can be, for example, a Diesel motor. The transmission 3 can be, for example, a powershift transmission with a hydrodynamic converter.

The joints 12 are complemented on the transmission side by rubber elements 14 which are supported on bearing brackets 15. The bearing brackets 15 can be produced as one piece with the housing of the transmission 3, for example, by direct casting. But it also is possible to mount them as separate parts.

Bearing brackets in the form of guide rods 16, for example, are likewise provided on the axle side in the housing of the differential transmission 4. Said guide rods can also be manufactured as one piece with the housing of the differential transmission 4 or with the axle pipes. The free ends of the guide rods 16 are designed in the form of a fork. The forked ends 17 are penetrated by bolts 18; the rubber elements 14 rest on said bolts 18 via adequate bearing bushes. Through the centers of the bolts 18 extends the axis of rotation 19 indicated with dots about which is possible a rotary movement of the elements 2 and 3 of the drive train 1. Lateral divergences are compensated by the third supporting point 13. To compensate for errors in the lateral direction by the third supporting point 13, rubber elements can also be advantageously used.

It is evidently possible to reverse the configuration shown so that the guide rods 16 are component parts of the transmission housing 3 and the supporting brackets 15 component parts of the axle 6. The use of rubber elements is not indispensably required. But it is advantageous for damping noise transmission.

Figure 4:
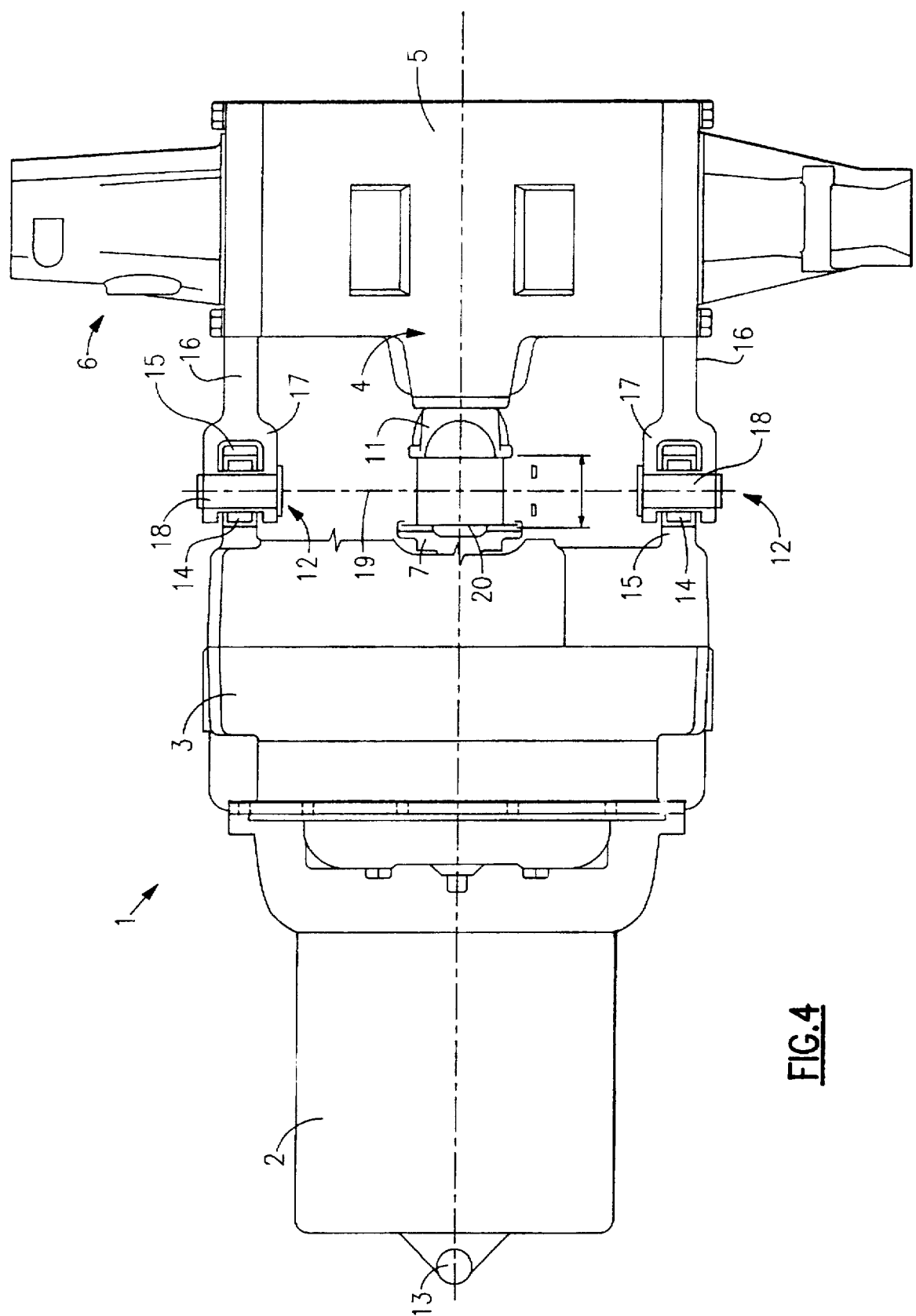
FIG. 4 is a top view on the drive train according to FIG. 3.

It can be seen from the top view of FIG. 4 that the distance from the flange of the output shaft 7 and the flange of the input shaft 11 of the differential transmission 4 from the axis of rotation 19 is equal. Axial changes of length caused by different angles of inflection result in the drive train (output shaft 7, joint shaft 9 and input shaft 11). Said axial shifts must be compensated. The flange of the output shaft 7 of the transmission is preferably axially movably mounted. But it is also alternatively possible to support the flange or the input shaft 11 of the differential transmission 4 axially movably. Another suitable articulation can be used instead of the short joint shaft 9. The use of a universal joint, for example, is possible.

| Reference numerals | |
|---|---|
| 1 drive train | 11 input shaft |
| 2 drive motor | 12 joint |
| 3 transmission | 13 joint |
| 4 differential transmission | 14 rubber elements |
| 5 symmetrical housing | 15 bearing bracket |
| 6 axle | 16 guide rod |
| 7 output shaft | 17 forked end |
| 8 joint | 18 bolt |
| 9 joint shaft | 19 axis of rotation |
| 10 joint | |

We claim:

1. A motor-vehicle drive train (1) having a drive motor (2), a transmission (3) and a differential transmission (4) driving an axle (6); a joint shaft (9) connecting an output shaft (7) of said transmission (3) with an input shaft (11) of said differential transmission (4) via joints (8, 10), and said drive motor (2) and said transmission (3) being pivotably situated about an axis of rotation (19) which is located adjacent a center of said joint shaft (9) and extending perpendicular to said drive train;

wherein said drive motor (2) and said transmission (3) are both supported by an additional joint (13) which absorbs lateral divergences of said drive train;

said axis of rotation (19) extends through a center of two bolts (18), which are components of two pivot joints (12), which interconnect said transmission (3) with said axles (6); and said two bolts (18) of said two pivot joints (12) are passed through rubber elements (14) situated in one of a bearing bracket (15) and a guide rod (16).

2. A drive train according to claim 1, wherein one of said bearing bracket (15) and said guide rod (16) is fastened to one of said transmission (3) and said axle (6).

3. A drive train according to claim 1, wherein said bearing bracket (15) is formed integral with one of said transmission (3) and said axle (6).

4. A drive train according to claim 1, wherein said guide rod (16) is formed integral with one of said transmission (3) and said axle (6).

5. A drive train according to claim 1, wherein said guide rod (16) has a fork-like end (17) which receives said bolts (18).

6. A drive train according to claim 5, wherein said bearing bracket (15) meshes with a U-shaped free space of said fork-like ends (17).

7. A motor-vehicle drive train (1) having a drive motor (2), a transmission (3) and a differential transmission (4) driving an axle (6); a connection between an output shaft (7) of said transmission (3) and an input shaft (11) of said differential transmission (4); and said drive motor (2) and said transmission (3) being pivotably situated about an axis of rotation (19) which is located adjacent the center of said connection and extending perpendicular to said drive train;

wherein both said drive motor (2) and said transmission (3) are pivotably supported to a framework by a third joint (13), at a location spaced from said axis of rotation (19), to allow said drive motor (2) and said transmission (3) to pivot about said axis of rotation (19), and said third joint (13) absorbs lateral divergences in said drive train (1).

8. A drive train according to claim 7, wherein said transmission (3) is pivotably coupled to said axle (6) via at least one bearing bracket (15) engaged with a guide rod (16), and said at least one bearing bracket (15) and said guide rod (16) pivot relative to one another about said axis of rotation (19).

9. A drive train according to claim 8, wherein a universal joint (20) forms said connection between said output shaft (7) to said input shaft (11).

10. A drive train according to claim 8, wherein said transmission (3) is pivotably coupled to said axle (6) via a pair of spaced apart brackets (15), supported by one of said transmission (3) and said axle (6), which are each connected with a respective guide rod (16), supported by the other of said transmission (3) and said axle (6), via a bolt (18), and said axis of rotation (19) extends through a center of each of said bolts (18).

11. A drive train according to claim 10, wherein each of said bolts (18) is passed through a rubber element (14) supported by one of said bearing bracket (15) and said guide rod (16).

12. A drive train according to claim 11, wherein one of said bearing bracket (15) and said guide rod (16) is fastened to one of said transmission (3) and said axle (6).

13. A drive train according to claim 11, wherein said bearing bracket (15) is integral with one of said transmission (3) and said axle (6).

14. A drive train according to claim 11, wherein said guide rod (16) has a forked end (17) which receives one of said bolts (18).

15. A drive train according to claim 14, wherein said bearing bracket (15) meshes with a U-shaped free space of said forked end (17).

16. A drive train according to claim 8, wherein a shaft (9), which supports a joint (8 or 10) on each opposed end of the shaft (9), forms said connection between said output shaft (7) and to said input shaft (11).

17. A motor-vehicle drive train (1) having a drive motor (2), a transmission (3) and a differential transmission (4) driving an axle (6); a universal joint (20) connecting an output shaft (7) of said transmission (3) with an input shaft (11) of said differential transmission (4), said drive motor (2) and said transmission (3) being pivotably situated about an axis of rotation (19) which is located adjacent a center of said universal joint (20) and extending perpendicular to said drive train;

wherein said drive motor (2) and said transmission (3) are both supported by an additional joint (13) which absorbs lateral divergences of said drive train;

said axis of rotation (19) extends through a center of two bolts (18), which are components of two pivot joints (12), which interconnect said transmission (3) with said axles (6); and said two bolts (18) of said two pivot joints (12) are passed through rubber elements (14) situated in one of a bearing bracket (15) and a guide rod (16).

* * * * *